United States Patent
Ueno et al.

[11] Patent Number: 6,056,445
[45] Date of Patent: May 2, 2000

[54] RESIN COATED BEARING

[75] Inventors: Hiroshi Ueno, Tondabayashi; Tsuyoshi Okumura, Yamatokoriyama; Mitiru Ueda, Kashiwara, all of Japan

[73] Assignee: Koyo Seiko Co., Ltd., Osaka, Japan

[21] Appl. No.: 08/954,872

[22] Filed: Oct. 21, 1997

[30] Foreign Application Priority Data

Oct. 23, 1996 [JP] Japan .................................... 8-299575

[51] Int. Cl.⁷ .................................................. F16C 19/06
[52] U.S. Cl. ........................... 384/492; 384/537; 384/903
[58] Field of Search .................................. 384/492, 537, 384/903, 909, 910, 585

[56] References Cited

U.S. PATENT DOCUMENTS

| | | |
|---|---|---|
| 4,006,659 | 2/1977 | Wurzel et al. . |
| 5,141,339 | 8/1992 | Evans ........................................ 384/130 |
| 5,375,933 | 12/1994 | Mizutani et al. ........................ 384/492 |
| 5,785,433 | 7/1998 | Takahashi et al. ....................... 384/903 |

FOREIGN PATENT DOCUMENTS

| | | |
|---|---|---|
| 56-131024 | 10/1981 | Japan . |
| 6-54131 | 9/1987 | Japan . |

*Primary Examiner*—Lenard A. Footland
*Attorney, Agent, or Firm*—Jacobson, Price, Holman & Stern, PLLC

[57] ABSTRACT

A resin coated bearing has an arrangement wherein the outer circumference of a resin coat piece is partially projected from a circumferential groove extended along the outer circumference of an outer ring of the bearing so that variations of the outside diameter of the resin coat piece may be reduced by a portion hidden by the circumferential groove.

14 Claims, 6 Drawing Sheets

RESIN COATED BEARING

BACKGROUND OF THE INVENTION

1. Field of the Invention

The present invention relates to a resin coated bearing and, more particularly, to a resin coated bearing provided with a resin coat piece for preventing the occurrence of creep, the resin coat piece being formed in a groove extended along the outer circumferential surface of an outer ring of the bearing.

2. Description of the Prior Art

In case where a steel bearing is incorporated in a housing which has a great thermal expansion coefficient such as formed of an aluminum alloy, when the ambient temperature rises, an interference between fitting portions of an outer ring of the bearing and of the housing decreases due to a difference in the thermal expansion coefficients of the both. This results in the occurrence of so-called creep wherein the outer ring of the bearing turns relative to the housing.

For the purpose of preventing the occurrence of such creep, there have been offered resin coated bearings provided with a resin coat piece along the outer circumferential surface of the outer ring thereof (see, for example, Japanese Unexamined Utility Model Publication No.56(1981)-131024 and Japanese Examined Patent Publication No.6 (1994)-54131).

Figure 8:
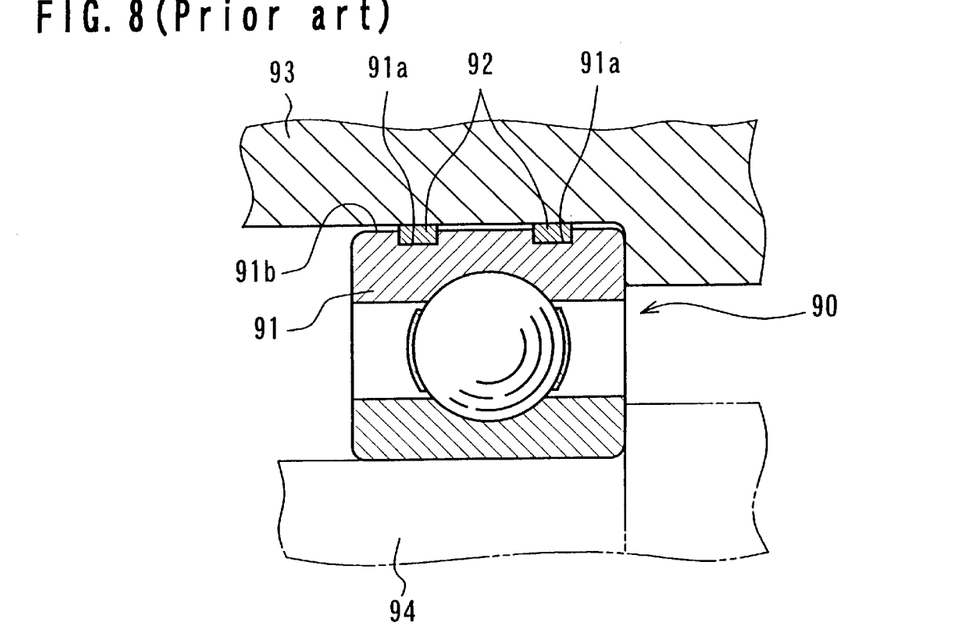
FIG. 8 is a sectional view of a related portion of an example of the prior-art resin coated bearing.

FIG. 8 is a sectional view of a principal portion of an example of the prior-art resin coated bearing. Referring to the figure, a resin coated bearing 90 rotatably carries a shaft 94 relative to a housing 93. The resin coated bearing 90 has an annular resin coat piece 92 disposed in a circumferential groove 91a extended along the outer circumferential surface 91b of an outer ring 91 thereof.

Figure 9:
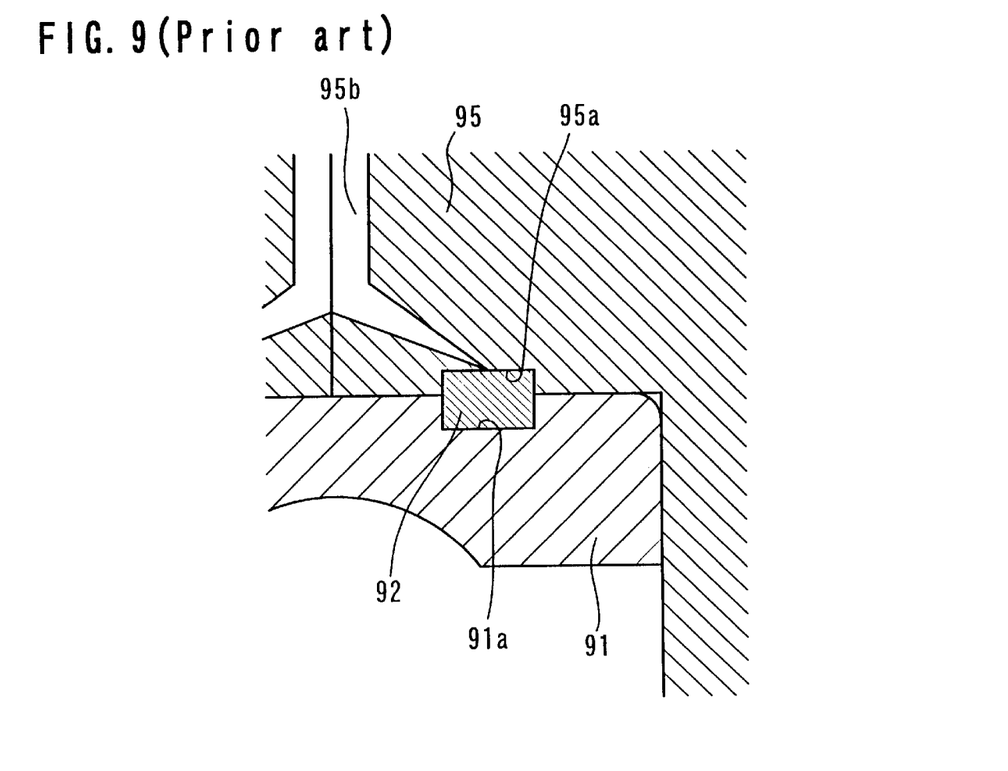
FIG. 9 is a sectional view of a related portion for illustrating a process wherein the prior-art resin coat piece of the bearing is injection molded.

As shown in FIG. 9, the resin coat piece 92 is formed by injecting a resin material through a gate 95b into an injection mold 95 loaded with the outer ring 91, the injection mold 95 being formed with a concave groove 95a so configured as to correspond to the circumferential groove 91a of the outer ring 91.

In the resin coated bearing 90, the whole length of the outer circumference of the resin coat piece 92 is projected some tens of micrometers from the outer circumferential surface 91b of the outer ring 91 so that the frictional resistance of the resin coat piece 92 may prevent the outer ring 91 from turning relative to the housing 93 even when the interference between the fitting portions of the housing 93 and the outer ring 91 is decreased.

Examples of the resin material for forming the resin coat piece 92 include polyamide 66 (PA66), polyamide 11 (PA11), polybutylene terephthalate (PBT) and the like.

In order to assure the fitting precision with respect to the housing 93, the resin coated bearing 90 must include the resin coat piece 92 having a high precision of the outside diameter thereof. Unfortunately, the resin coat piece 92 cannot rely only upon the injection molding for assuring the high precision of the outside diameter thereof. Therefore, after completion of the injection molding, the resin coat piece 92 must be subject to a process for grinding the outer circumference thereof for achieving the high precision of the outside diameter thereof. Consequently, the production cost is increased by the cost for the grinding process.

The aforementioned resin materials (PA66, PA11, PBT) used for the conventional resin coat piece 92 have properties as shown in the following Table 1. Based on these properties, each of the resin materials is evaluated as shown in Table 2. Incidentally, the circle in the Table 2 denotes "excellent", whereas the triangle denotes "relatively inferior".

As appreciated from Table 2, however, the resin materials have respective problems although they fully serve the purpose of preventing the creep. More specifically, PA66 has a great dimensional change due to water absorption. PA11 is incapable of withstanding continuous use for a long term at a temperature above 150° C., for example. Furthermore, PA11 is more expensive and less versatile in general as compared with PBT and PA66. PBT, in turn, is incapable of withstanding continuous use for a long term at a temperature above 150° C., for example.

TABLE 1

| Properties | Resin types | | |
|---|---|---|---|
| | PA66 | PA11 | PBT |
| Specific gravity | 1.13 | 1.04 | 1.31 |
| Water absorption [%] | 8.5 | 2.5 | 0.4 |
| Tensile strength [Mpa] | 83 | 56 | 52 |
| Flexural strength [Mpa] | 118 | 66 | 93 |
| Fusion point [° C.] | 260 | 187 | 225 |
| Thermal deformation temperature [° C.] At load of 0.46 Mpa | 230 | 154 | 154 |
| Thermal expansion coefficient [$10^{-5}$/° C.] | 8.1 | 15 | 10 |
| Cost ratio (based on PA66 as 1) | 1 | 3.2 | 1.3 |

TABLE 2

| Evaluation item | Resin types | | |
|---|---|---|---|
| | PA66 | PA11 | PBT |
| Creep torque | ○ | ○ | ○ |
| Heat resistance | ○ | Δ | Δ |
| Dimensional stability | Δ | ○ | ○ |
| Cost | ○ | Δ | ○ |

OBJECT AND SUMMARY OF THE INVENTION

An object of the present invention is to provide a resin coated bearing allowing for the elimination of the grinding process for the resin coat piece. It is another object of the present invention to offer a resin coated bearing which is less costly and has an excellent performance for preventing the creep.

To achieve the above objects, the resin coated bearing according to the invention comprises a resin coat piece for prevention of the creep formed in a groove extended along the outer circumferential surface of an outer ring of the bearing, the resin coat piece having the outer circumference thereof partially projected from the groove.

According to the resin coated bearing of the above construction, the outer circumference of the resin coat piece is partially projected from the groove extended along the outer circumferential surface of the outer ring. Thus, small-radius portions of the resin coat piece are hidden by the groove and therefore, variations of the outside diameter of the resin coat piece are reduced by the hidden portions. Hence, the resin coated bearing is allowed to assure the high fitting precision with respect to the housing simply by, for example, injecting a resin material into the groove to form the resin coat piece therein. Accordingly, the resin coat piece does not require the grinding of the outer circumference thereof, which is required by the prior art, and thus contributes to the lower production cost.

Preferably, the resin coat piece is composed of a base material of polyamide 66 (PA66) and mineral powder and elastomer powder which are dispersedly mixed in the base material. Mixture of the mineral powder eliminates occurrence of shrinkage or warp from the resin coat piece during the injection molding. Mixture of the elastomer powder is effective to slow down the curing process of the resin material, thereby facilitating an even application of pressure to the entire resin material. Transfer from the mold is thereby precisely executed. In addition, the elastomer powder contributes to a reduced water absorption of the resin material. Furthermore, the elastomer powder can more than compensate for a thermal expansion coefficient reduced by the mixture of the mineral powder for eliminating shrinkage and warp, rather increasing the overall thermal expansion coefficient of the resin material. More specifically, polyamide 66 has such advantages as good heat resistance, reasonable price and general versatility but has a disadvantage of poor dimensional stability, in particular, which can be improved by the employment of the mineral powder and the elastomer powder.

A preferable example of the mineral powder is calcium carbonate or mica. Also, a preferable example of the elastomer powder is a modified EPDM obtained by grafting maleic anhydride onto an ethylene-propylene-diene terpolymer or an ethylene-propylene copolymer (EPM).

A preferred particle size of the mineral powder is in the range of 1 to 3 $\mu$m, and a preferred particle size of the elastomer powder is in the range of 0.1 to 1 $\mu$m.

A mineral powder under 1 $\mu$m in particle size is hardly commercially available, resulting in higher costs. On the other hand, a mineral powder over 3 $\mu$m in particle size has a small thermal expansion coefficient, thereby reducing the effect for preventing the creep.

An elastomer powder under 0.1 $\mu$m in particle size is hardly commercially available, resulting in higher costs. On the other hand, an elastomer powder over 1 $\mu$m in particle size presents a poor dispersiveness and may spoil both the strength and the precision of molding.

A preferred mixing rate of the mineral powder is 5 to 15 wt %, and a preferred mixing rate of the elastomer powder is 10 to 20 wt %.

If a content of the mineral powder is under 5 wt %, the addition thereof does not provide a sufficient effect. If a content thereof exceeds 15 wt %, the resultant resin material is reduced in the thermal expansion coefficient, thus reduced in the effect of preventing the creep. If a content of the elastomer powder is under 10 wt %, the addition thereof does not provide a sufficient effect. If a content thereof exceeds 20 wt %, the resultant resin material is reduced in the roundness and the tensile strength.

DESCRIPTION OF THE PREFERRED EMBODIMENT

Figure 2:
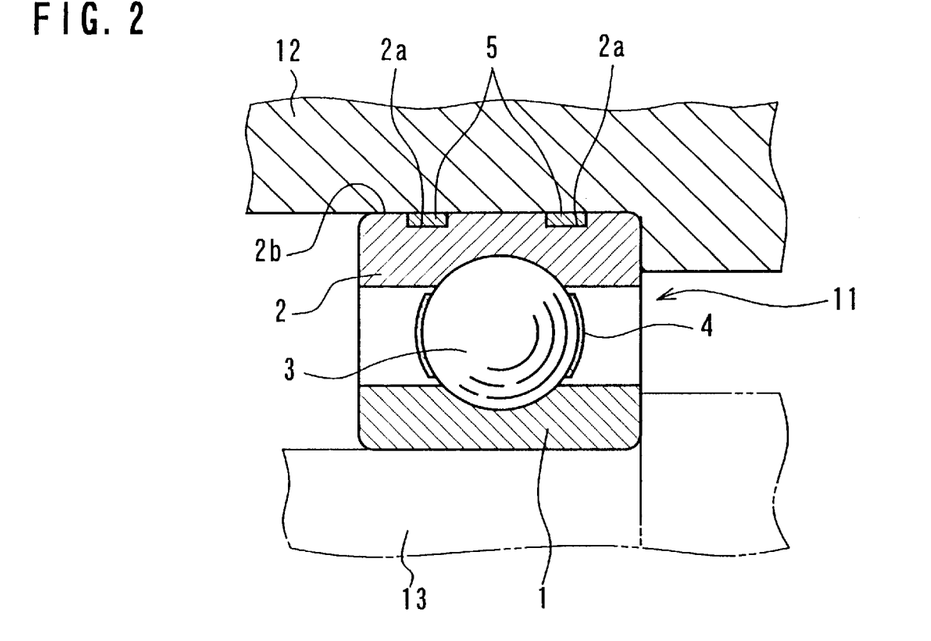
FIG. 2 is a sectional view of a related portion of the above resin coated bearing during use for illustrating a state wherein a housing is not expanded.
Figure 3:
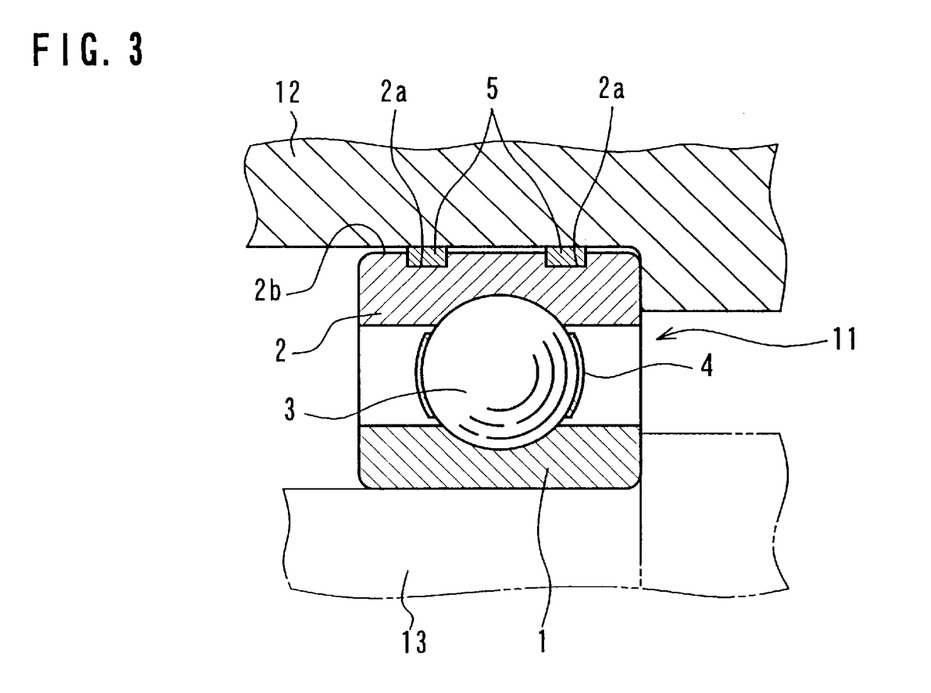
FIG. 3 is a sectional view of a related portion of the above resin coated bearing during use for illustrating a state wherein the housing is expanded.

Hereafter, an embodiment of the present invention will be described with reference to the accompanying drawings. FIG. 2 is a sectional view of a related portion for illustrating an embodiment of a resin coated bearing 11 according to the invention. The resin coated bearing 11 is composed of an inner ring 1, an outer ring 2, a ball 3 as a rolling body, a retainer 4 and a resin coat piece 5. The ball 3 is rotatably retained between the inner ring 1 and the outer ring 2. A shaft 13 is fitted in the inner circumference of the inner ring 1. The outer ring 2 with the resin coat piece 5 attached to the outer circumference thereof for prevention of the creep is fitted in a housing 12 formed of an aluminum alloy. The resin coated bearing 11 is adapted such that despite a decreased interference between the outer ring 2 and the thermally expanded housing 12 or a gap produced between the housing 12 and the outer ring 2 as shown in FIG. 3, the resin coat piece 5 is thermally expanded to come into intimate contact with the housing 12, thereby assuring the interference therewith for prevention of the creep.

Figure 1:
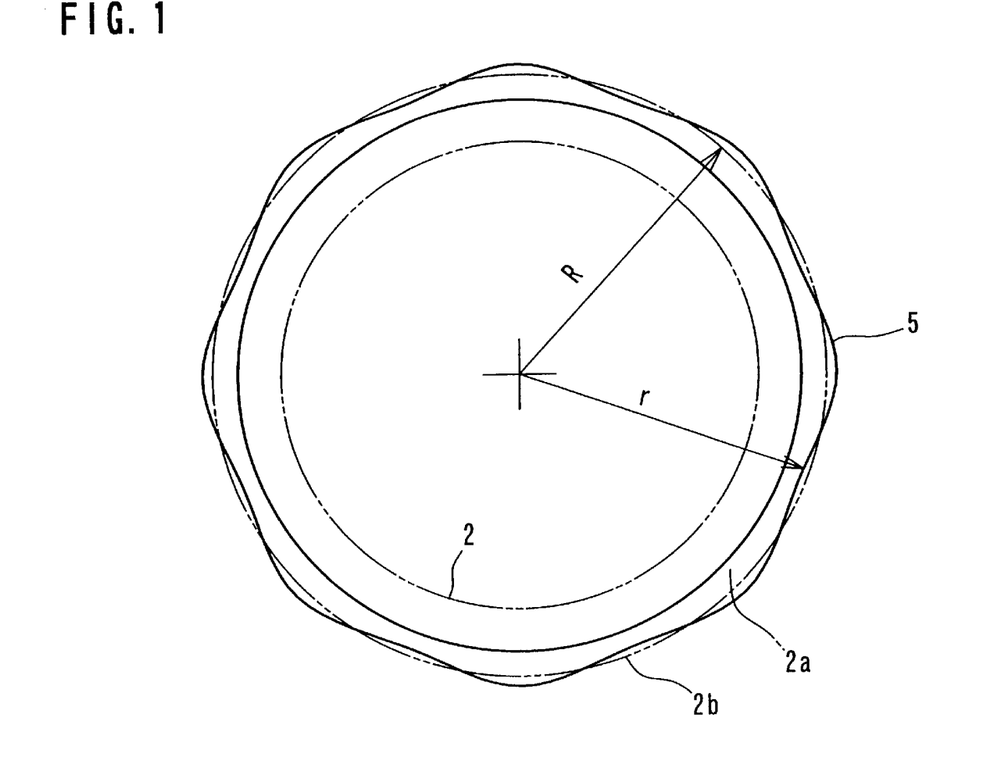
FIG. 1 is a schematic diagram for illustrating the relation between a resin coat piece and the outer circumference of an outer ring of a resin coated bearing according to the invention.

The resin coat piece 5 is disposed at the outer ring 2 in two streaks spaced widthwise (axially) from each other. Each resin coat piece 5 is imbedded in a circumferential groove 2a formed in the outer circumference 2b of the outer ring 2. The outer circumference of the resin coat piece 5 is partially projected from the circumferential groove 2a, or the outer circumference 2b of the outer ring 2. FIG. 1 schematically and exaggeratedly illustrates how the resin coat piece 5 is projected. That is, plural portions of the outer circumference of the resin coat piece 5 are projected from the outer circumference 2b of the outer ring 2, and the remaining portions of the resin coat piece 5 are recessed to be hidden by the circumferential groove 2a. A mean projection of the resin coat piece 5 from the outer circumference 2b of the outer ring 2 is properly determined based on a mean outside diameter of the resin coat piece 5. In case where the resin coat piece 5 has a mean outside diameter of 26 mm, for example, the mean projection thereof is set at about 5 to 6 $\mu$m. A maximum projection of the resin coat piece 5 is also properly determined based on the mean outside diameter thereof. In case where the resin coat piece has a mean outside diameter of 26 mm, for example, the maximum projection thereof is set at about 15 $\mu$m.

Figure 5:
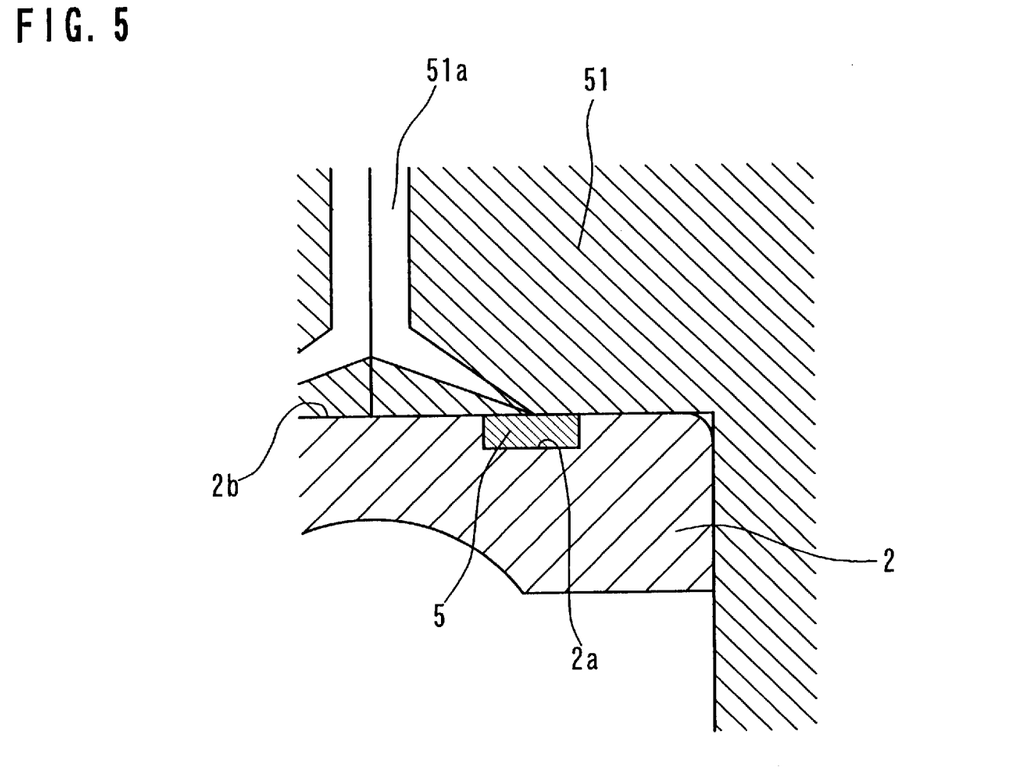
FIG. 5 is a sectional view of a related portion for illustrating a process wherein the resin coat piece is injection molded.

Such a resin coat piece 5 can be readily formed by injecting a resin material into the circumferential groove 2a of the outer ring 2 in such a manner that the resultant resin coat piece 5 may have a mean outside diameter smaller than the prior-art resin coat piece. More specifically, the prior-art injection mold 95 includes the concave groove 95a for forming the resin coat piece 92 so configured as to correspond to the circumferential groove 91a of the outer ring 91 (see FIG. 9). On the other hand, the resin coated bearing 11 of the invention utilizes a mold 51 without the aforesaid concave groove 95a, as shown in FIG. 5. The resin material is injected through a gate 51a into the circumferential groove 2a of the outer ring 2 inserted in the mold 51 until the resin material thus injected becomes substantially flush with the outer circumferential surface 2b of the outer ring 2. By virtue of expansion variations of the molded piece released from the mold, the variations resulting from the location of the gate 51a and varied molding pressures, the resin coat piece 5 may be formed with an undulating outer surface having some portions projecting from and some portions hidden by the mean outside diameter thereof.

In the resin coated bearing 11, the outer circumference of the resin coat piece 5 includes a portion having a radius r smaller than the radius R of the outer circumference 2b of the outer ring 2 and thus, such a recessed portion is hidden by the circumferential groove 2a of the outer ring 2, as shown in FIG. 1. The hidden portions have no effect on the interference with the housing 12. Accordingly, the practical variations of the outside diameter of the resin coat piece 5 is defined by a difference between the maximum outside diameter of the resin coat piece 5 and the outside diameter of the outer ring 2. Hence, the fitting precision with respect to the housing 1 can be assured simply by, for example, injecting the resin material into the circumferential groove 2a to form the resin coat piece. This eliminates the need for a grinding process to finish the outside diameter of the resin coat piece, which is required by the prior-art resin coat piece, and thus, the production cost is reduced by the elimination of the grinding process.

Figure 4:
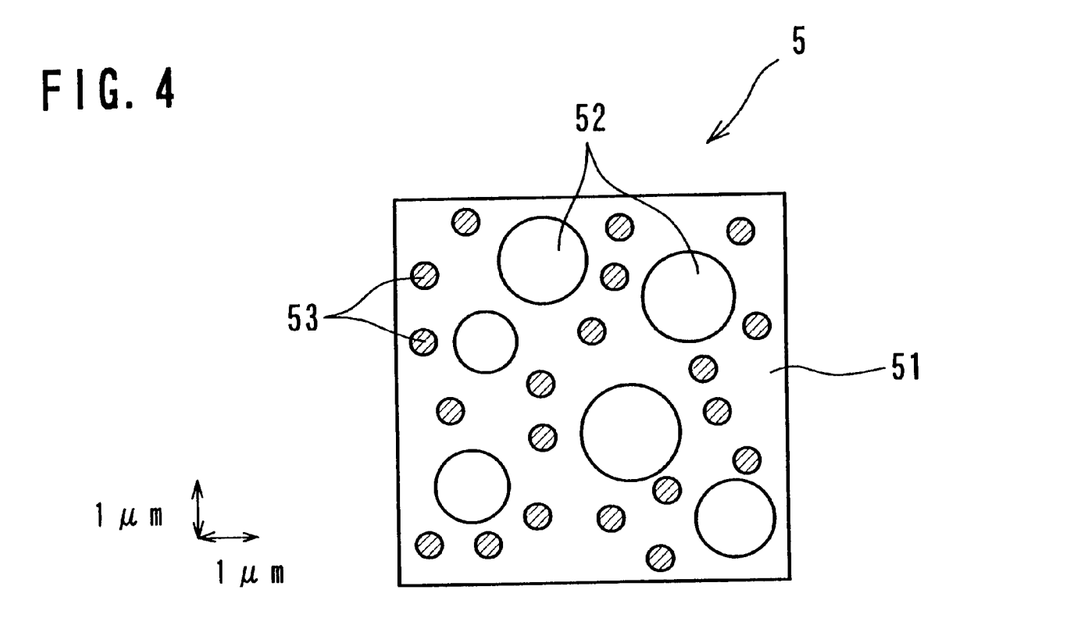
FIG. 4 is a schematic diagram for illustrating the configuration of the resin coat piece.

As shown in FIG. 4, the resin coat piece is composed of a base material 51 of polyamide 66 (PA66) and mineral powder 52 and elastomer powder 53 which are dispersedly mixed in the base material 51. Mixture of the mineral powder eliminates occurrence of shrinkage or warp from the resin coat piece during the injection molding. Mixture of the elastomer powder is effective to slow down the curing process of the resin material, thereby facilitating an even application of pressure to the entire resin material. Transfer from the mold is thereby precisely executed. In addition, the elastomer powder contributes to a reduced water absorption of the resin material. Furthermore, the elastomer powder can more than compensate for a thermal expansion coefficient reduced by the mixture of the mineral powder for eliminating shrinkage and warp, rather increasing the overall thermal expansion coefficient of the resin material. More specifically, polyamide 66 has such advantages as good heat resistance, reasonable price and general versatility but has a disadvantage of poor dimensional stability, in particular, which can be improved by the employment of the mineral powder and the elastomer powder.

Calcium carbonate or mica is suitable as the mineral powder 52. Modified EPDM or EPM is suitable as the elastomer powder 53. The modified EPDM is obtained by grafting maleic anhydride onto an ethylene-propylene-diene terpolymer containing a small amount of diene which is referred to as a tertiary component such as dicyclopentadiene, equilidene norbornene, 1,4-hexadiene and the like. The EPM is an ethylene-propylene copolymer.

A preferred particle size of the mineral powder 52 is in the range of 1 to 3 $\mu$m. A mineral powder 52 under 1 $\mu$m in particle size is hardly commercially available, thereby resulting in higher costs. On the other hand, a mineral powder 52 over 3 $\mu$m in particle size has a smaller thermal expansion coefficient, thereby leading to a reduced effect of preventing the creep.

A preferred particle size of the elastomer powder 53 is in the range of 0.1 to 1 $\mu$m. An elastomer powder 53 under 0.1 $\mu$m in particle size is hardly commercially available, thereby resulting in higher costs. An elastomer powder 53 over 1 $\mu$m in particle size presents a poor dispersibility and may spoil both the strength and the precision of molding.

A preferred mixing rate of the mineral powder 52 is 5 to 15 wt % (weight percentage), and a preferred mixing rate of the elastomer powder is 10 to 20 wt %. A most preferred mixing rate of both the powders combined is about 25 wt %.

If a content of the mineral powder 52 is under 5 wt %, the addition thereof does not provide a sufficient effect, whereas if a content thereof exceeds 15 wt %, the resultant resin material has a decreased thermal expansion coefficient, resulting in a reduced effect of preventing the creep.

Table 3 shows the results of comparison of the properties among resins containing different amounts of mineral powder 52 etc.

TABLE 3

| Properties | Resin types | | | |
|---|---|---|---|---|
| | PA11 (100%) | PA66 (60%) Mineral (40%) | PA66 (80%) Mineral (20%) | PA66 (75%) Mineral (10%) Elastomer (15%) |
| Mean roundness [$\mu$m] | 11.0 | 9.7 | 12.3 | 11.3 |
| Thermal expansion coefficient [$10^{-5}$/° C.] | 15 | 5 | 6 | 15 |
| Tensile strength [Mpa] | 56 | 100* | 89* | 58 |

Note: The resins with the asterisk "*" contain a mineral powder having a particle size of 5 $\mu$m, and the resins without the asterisk "*" contain a mineral powder having a particle size of 1 to 3 $\mu$m.

If a content of the elastomer powder 53 is under 10 wt %, the addition thereof does not provide a sufficient effect. On the other hand, if a content thereof exceeds 20 wt %, the resultant resin material is reduced in the roundness and the tensile strength. Table 4 shows the results of comparison of the properties among resins containing different amounts of elastomer powder 53.

TABLE 4

| Properties | Resin types | | |
|---|---|---|---|
| | PA11 (100%) | PA66 (80%) Elastomer (20%) | PA66 (70%) Elastomer (30%) |
| Mean roundness [$\mu$m] | 11.0 | 15.3 | 23.0 |
| Thermal expansion coefficient [$10^{-5}$/° C.] | 15 | 19 | 21 |

TABLE 4-continued

| | Resin types | | |
|---|---|---|---|
| Properties | PA11 (100%) | PA66 (80%) Elastomer (20%) | PA66 (70%) Elastomer (30%) |
| Tensile strength [Mpa] | 56 | 52 | 43 |

Taking the above into consideration, measurement was taken on the properties of a preferred example of the resin coat piece 5. The results are shown in Table 5.

The resin coat piece 5 of this example is composed of a powder-like calcium carbonate, as the mineral powder 52, having a particle size of 1 to 3 μm and a powder-like modified EPDM, as the elastomer powder 53, having a particle size of 0.1 to 1 μm. The resin coat piece 5 is composed of 75 wt % of the base material 51, 10 wt % of the mineral powder 52 and 15 wt % of the elastomer powder 53.

From Table 5 and Table 1 illustrating the prior art, it should be appreciated that the aforementioned resin coat piece 5 is improved in the drawback of water absorption which is attributable to polyamide 66 used as the base material 51. Additionally, the thermal expansion coefficient of resin coat piece 5 is increased to the same level with that of PA11.

TABLE 5

| Properties | Embodiment |
|---|---|
| Specific gravity | 1.18 |
| Water absorption [%] | 6.2 |
| Tensile strength [Mpa] | 58 |
| Flexural strength [Mpa] | 78 |
| Fusion point [° C.] | 260 |
| Thermal deformation temperature [° C.] at load of 0.46 Mpa | 218 |
| Thermal expansion coefficient [$10^{-5}$/° C.] | 15 |
| Cost ratio (based on PA66 as 1) | 1.3 |

Next, the resin coated bearing as shown in FIG. 1 with the resin coat piece 5 having the compositions based on the above measurements of the properties were examined for the creep torque during use and the dimensional change due to water absorption after being allowed to stand in a warehouse for a long term. The results are shown in FIG. 6 and FIG. 7.

In the above measurements of the static creep torque, a resin coated bearing as an example of the embodiment employed a bearing with a bearing number of 6202, to which a resin coat piece having a mean outside diameter of 35.015 mm was attached. On the other hand, the housing had a mean inside diameter of 35.014 mm and was formed of an aluminum alloy.

Figure 6:
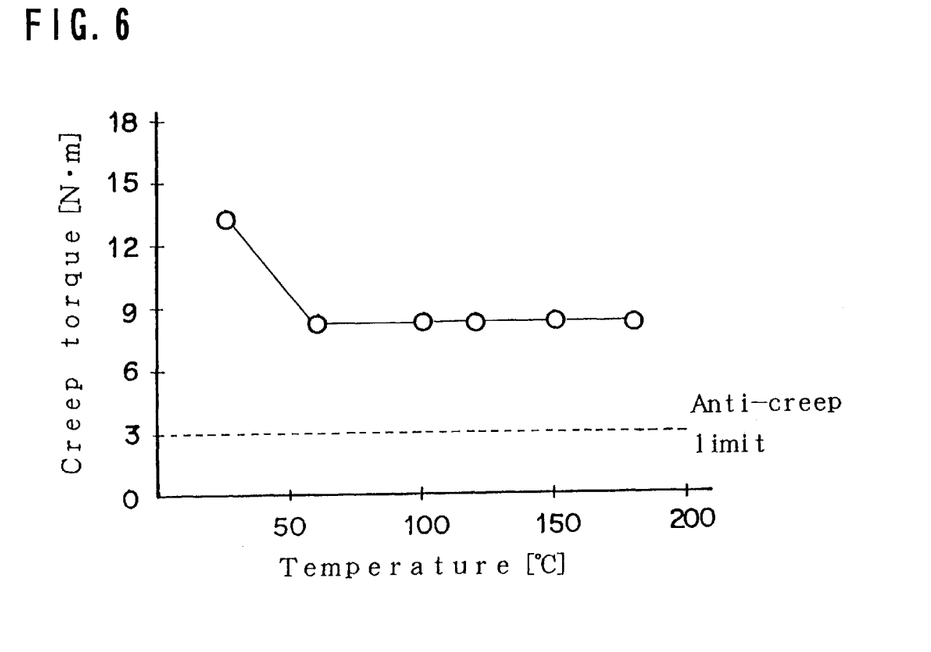
FIG. 6 is a graph of the relationship between the creep torque of the bearing and the ambient temperature.
Figure 7:
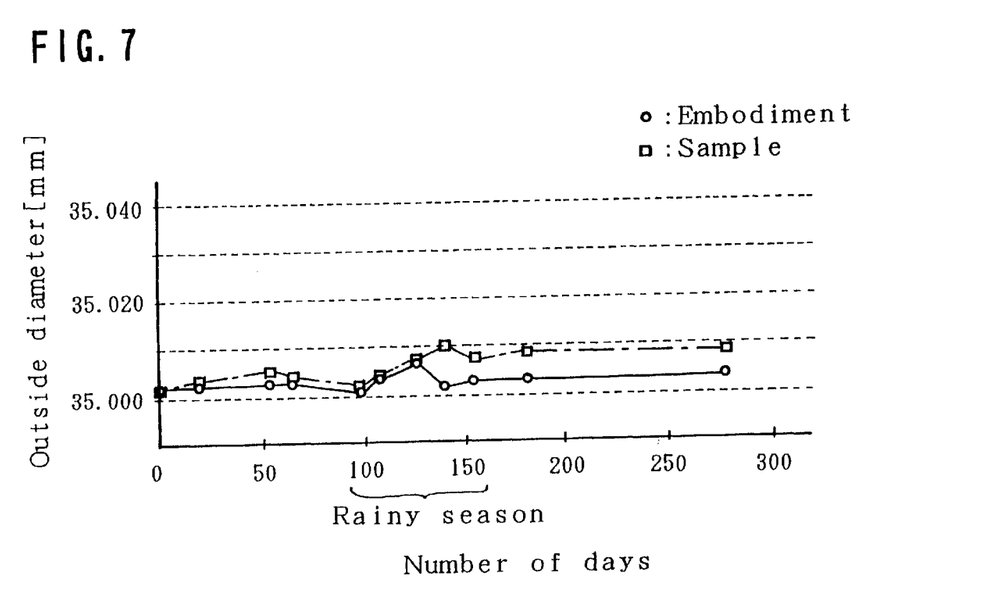
FIG. 7 is a graph of the relationship between the total number of days during which the resin coat piece was allowed to stand and the change in the outside diameter thereof.

It is apparent from FIG. 6 that the resin coated bearing is capable of sufficiently preventing the creep at temperatures up to 180° C. even if the resin coat piece and the housing are substantially of the same size.

In the measurement of the dimensional change due to water absorption, a resin coated bearing as an example of the embodiment employed a bearing with a bearing number of 6000, which had an outside diameter of 35 mm and to which one streak of a 1.6 mm-wide resin coat piece of the embodiment was attached. A resin coated bearing of Comparative sample had the same construction as that of the above example except for that the resin coat piece was formed of PA11.

It is apparent from FIG. 7 that the resin coat piece of the embodiment presented dimensional changes smaller than that of Comparative sample through the whole period, although exhibiting a great dimensional fluctuation during the rainy season.

Thus, the resin coated bearing of the invention provides desired capabilities in terms of creep torque, heat resistance, dimensional stability and the like, and also contributes to the reduction of production costs.

It is to be noted that the resin coat piece 5 only needs to have at least one portion thereof projected from the circumferential groove 2a of the outer ring 2.

It is obvious to those skilled in the art that the resin coated bearing of the invention should not be limited to the above embodiment but various modifications thereof will occur without departing from the spirit of the invention. For example, the resin coated bearing may be provided with three or more streaks of the resin coat piece.

What is claimed is:

1. A resin coated bearing comprising:
   a) an outer ring; and
   b) a resin coat piece for prevention of creep, formed as a closed-end ring in a circumferential groove extending along an outer circumferential surface of said outer ring, and having:
      1) an innermost circumferential surface of circular shape conforming to an entire bottom surface of said outer ring's groove; and
      2) an outermost circumferential surface that includes:
         i) protruding portions that project outwardly from said groove; and
         ii) recessed portions;
      the protruding portions and the recessed portions being formed by expansion variations of resin released from a mold, and positioned in said groove to have a radial-direction section height that alternately increases and decreases along a circumferential direction of said resin coat piece.

2. The resin coated bearing of claim 1, wherein said resin coat piece comprises a base material of polyamide 66 and mineral powder and elastomer powder which are dispersedly mixed in said base material.

3. The resin coated bearing of claim 2, wherein said mineral powder is one of calcium carbonate and mica, and said elastomer powder is one of a modified EPDM obtained by grafting maleic anhydride onto an ethylene-propylene-diene terpolymer and an ethylene-propylene copolymer.

4. The resin coated bearing of claim 3, wherein said mineral powder has a particle size of 1 to 3 μm and said elastomer powder has a particle size of 0.1 to 1 μm.

5. The resin coated bearing of claim 3, wherein a mixing rate of said mineral powder is 5 to 15 wt % and a mixing rate of said elastomer powder is 10 to 20 wt %.

6. The resin coated bearing of claim 2, wherein said mineral powder has a particle size of 1 to 3 μm and said elastomer powder has a particle size of 0.1 to 1 μm.

7. The resin coated bearing of claim 2, wherein a mixing rate of said mineral powder is 5 to 15 wt % and a mixing rate of said elastomer powder is 10 to 20 wt %.

8. The resin coated bearing of claim 1, wherein said outermost circumferential surface of said resin coat piece is of undulating configuration.

9. The resin coated bearing of claim 8, wherein said resin coat piece comprises a base material of polyamide 66 and mineral powder and elastomer powder which are dispersedly mixed in said base material.

10. The resin coated bearing of claim 9, wherein said mineral powder is one of calcium carbonate and mica, and said elastomer powder is one of a modified EPDM obtained by grafting maleic anhydride onto an ethylene-propylene-diene terpolymer and an ethylene-propylene copolymer.

11. The resin coated bearing of claim 10, wherein a mixing rate of said mineral powder is 5 to 15 wt % and a mixing rate of said elastomer powder is 10 to 20 wt %.

12. The resin coated bearing of claim 9, wherein said mineral powder has a particle size of 1 to 3 $\mu$m and said elastomer powder has a particle size of 0.1 to 1 $\mu$m.

13. The resin coated bearing of claim 9, wherein a mixing rate of said mineral powder is 5 to 15 wt % and a mixing rate of said elastomer powder is 10 to 20 wt %.

14. The resin coated bearing of claim 8, wherein said mineral powder has a particle size of 1 to 3 $\mu$m and said elastomer powder has a particle size of 0.1 to 1 $\mu$m.

* * * * *